July 18, 1967  K. S. RODAWAY  3,332,045
PERMANENT MAGNET AND ELECTROMAGNETIC ACTUATOR
Filed March 11, 1965  2 Sheets-Sheet 1

INVENTOR.
KEITH S. RODAWAY
BY Fulwider, Patton, Rieber, Lee, and Utecht
ATTORNEYS July 18, 1967  K. S. RODAWAY  3,332,045
PERMANENT MAGNET AND ELECTROMAGNETIC ACTUATOR
Filed March 11, 1965  2 Sheets-Sheet 2
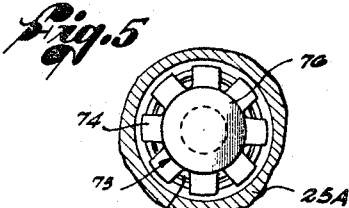
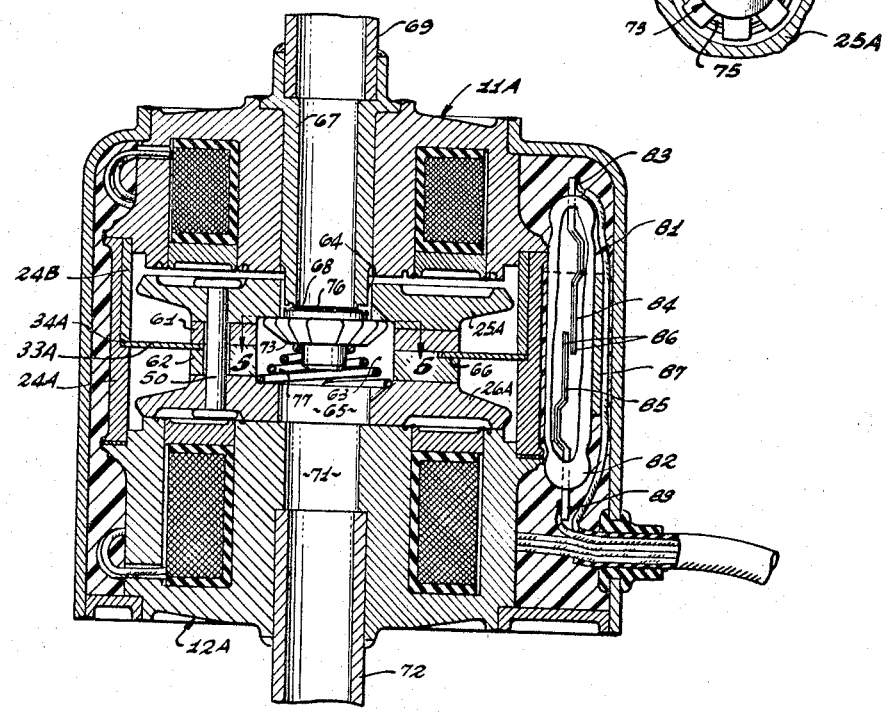
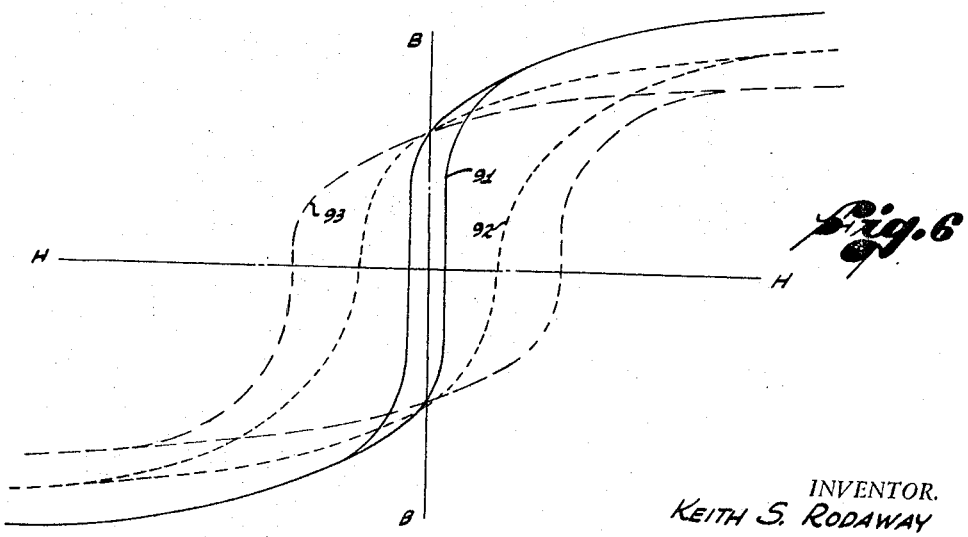
INVENTOR.
KEITH S. RODAWAY
BY Fulwider, Patton, Rieber
Lee, and Utecht
ATTORNEYS United States Patent Office 3,332,045
Patented July 18, 1967

3,332,045
PERMANENT MAGNET AND ELECTRO-
MAGNETIC ACTUATOR
Keith S. Rodaway, Palos Verdes, Calif., assignor to
Parker-Hannifin Corporation, Cleveland, Ohio, a corporation of Ohio
Filed Mar. 11, 1966, Ser. No. 533,567
13 Claims. (Cl. 335—81)

The present invention relates generally to polarized electromagnetic actuators and more particularly to an actuator having a permanent magnet armature and a pair of electromagnetic coils for moving the actuator armature in opposite directions.

In the actuator of the present invention, both of the operating coils are preferably used for moving the actuator in both directions, and magnetic latching of the actuator in each direction of operation is attained without the use of extra mechanism and without requiring continuous energization of the operating coils.

The operating coils establish electromagnetic fields in magnetic material which present pairs of pole faces of opposite polarity with the pairs spaced apart and receiving therebetween the pole faces of the permanent magnet armature. The armature material desirably has a relatively wide magnetic hysteresis loop characteristic of permanent magnet materials. The magnetic material of the electromagnetic operators may have hysteresis loops of widths selected for the operating characteristics desired. A narrow magnetic hysteresis loop permits changing the polarity of the electromagnet with a minimum application of current but with little or no retained bucking magnetic field when the coil at the air gap is deenergized. Where a material employing a wider magnetic hysteresis loop is employed for electromagnets of substantial size they function as semi-permanent magnets, with a memory of their previous magnetization, when their coils are deenergized whereby the poles at the air gap remain magnetized oppositely to the poles of the armature, thereby effecting repulsion from the separated electromagnet which adds to the latching force of the engaged electromagnet. It will of course be understood that the hysteresis loop of the electromagnet material should not be so wide as to result in its magnetization causing appreciable demagnetization of the permanent magnets.

In the illustrated exemplification of the invention the permanent magnet armature is in the form of a pair of permanent magets, each individual to its opposed electromagnet but rigidly connected together to form a unitary armature. Each permanent magnet has a pair of annular pole faces of opposite polarity facing in the same axial direction and the pole faces of the individual magnets face in opposite directions toward the pole faces of their respective electromagnets.

Also in the illustrated exemplification of the invention the permanent magnet armature is axially guided and supported by means of a substantially frictionless spring in the form of a disc, spider, or the like, providing relatively free movement of the armature in axial directions toward and away from the electromagnets.

Another feature of the invention as illustrated in the drawings is the annular configuration of the permanent magnets, each providing an outer, axially facing annular pole face adjacent its rim and an inner annular pole face of opposite polarity facing in the same direction, the pole faces of each permanent magnet being directed axially in the same direction toward its cooperating electromagnet and presenting substantially equal areas for the flux path. The electromagnets are located at opposite sides of the permanent magnet armature and each has a pair of pole faces complementary to and opposing the pair of pole faces of its cooperating permanent magnet. The energizing coils for the electromagnets are wound and energized so that the electromagnets are energized at the same time but in different polarity with respect to their cooperating permanent magnets. Thus when the actuator is to be operated from one latched position to the other, the electromagnet which is engaged by the pair of poles its permanent magnet in said one latched position is magnetized to provide a pair of magnetic poles of the same polarity as the poles as its permanent magnet, while the other electromagnet is magnetized to provide a pair of magnetic poles of polarity opposite to the polarity of the pair of poles of its cooperating but separated permanent magnet, the latter being thereby pulled by said electromagnet to move the armature to its other latched position.

At that electromagnet which is engaged by the pair of poles of opposite polarity of its permanent magnet to latch the armature in said one position and is newly magnetized to provide a pair of poles of opposite polarity but of the same polarity as its permanent magnet, the pull curve between the pairs of permanent magnet and electromagnet poles may be such that repulsion does not take place while the magnetizing current is flowing, but the original latching force is only lessened to be more easily overcome by the attraction between the originally separated and now oppositely polarized pairs of permanent magnet and electromagnet poles. After the actuator stroke the magnetizing current may be interrupted and in the case where the electromagnet material has a relatively wide hysteresis loop and a magnetic memory, it is semi-permanent in operation and retains its magnetization. The electromagnet now separated from its permanent magnet after the actuator stroke has its pair of poles polarized oppositely to the adjacent pair of poles in its permanent magnet to effect repulsion between the opposed pairs of poles to thereby increase the magnetic latching force on the armature. It will be understood that this semi-permanent polarity retention in the pair of poles on the electromagnet is an optional feature whose use may be contra-indicated with employment of narrow magnetic hysteresis curve electromagnet materials, particularly in small size actuators.

The magnetizing currents through the electromagnet coils will flow in directions dictated by the directions in which the coils are wound to produce the desired electromagnet polarities above described. The coils may be fed in series or parallel if the currents therethrough are to be equal, or it may be preferred to apply a much higher magnetizing current to that one which is the open-gap, pulling electromagnet in a given position of the armature over the magnetizing current fed to the electromagnet which in said given position of the armature is engaged by its permanent magnet.

Another optional feature of the present invention is the use of a magnetic reed switch to indicate the position of the armature in the actuator. This switch is positioned so that it will be closed by magnetic fields in only one operated position of the armature and will be open in all other positions of the armature. Preferably, the field from the permanent magnet in that unique position of the armature is sufficient to keep the switch closed even after electrical power is removed, but if the armature should be forced loose from that position by external force, or by opposite operation of the actuator, the switch will open to indicate by its open circuit position that the armature is not in that unique position.

The actuator according to the present invention finds particular application in relatively short stroke operation and one use thereof for controlling a valve has been illustrated for in the drawing.

It is therefore an object of the present invention to provide an improved polarized electromagnetic actuator.

Another object of this invention is the provision of an improved polarized electromagnetic actuator having a permanent magnet armature providing concentric annular pole faces, oppositely polarized, facing in the same direction, and having their planes at right angles to the direction of armature movement.

Another object of the present invention is the provision of an improved polarized electromagnetic actuator in accordance with the preceding object in which the armature employs a pair of oppositely directed permanent magnets of annular form, each permanent magnet having a pair of pole faces of opposite polarity facing in the same direction and with the pairs of opposite polarity pole faces facing a pair of pole faces thereon in opposite directions, together with electromagnets at opposite sides of the armature and each having axially of opposite polarity facing in the same direction toward the pole faces of its adjacent armature permanent magnet.

A further object of the present invention is the provision of an improved polarized electromagnetic actuator having a magnetic switch associated therewith providing an exterior indication of a unique actuator position.

A still further object of this invention is the provision of an improved polarized electromagentic actuator which latches magnetically in each of two opposite positions without requiring additional latching mechanism nor electrical power therefor.

Yet another object of this invention is the provision of an improved polarized electromagnetic actuator employing a pair of electromagents cooperating individually with a pair of permanent magnets forming an armature in which the electromagnets are energized at the same time but with relative opposite polarity with respect to the polarity of the permanent magnets of the armature and in which the pulling, gap-open electromagnet is always energized with a larger current regardless of the direction in which the armature is to be moved.

Another object of the present invention is the provision of an improved polarized electromagnetic actuator employing a pair of electromagnets having an armature therebetween comprising two permanent magnets individually cooperating with their respective electromagnets, and in which the electromagnets are of semi-permanent, relatively wide magnetic hysteresis loop material to provide a magnetic memory of the energization of the electromagnets after termination of the magnetizing current therefor, whereby to effect repulsion after current termination between the permanent magnet which is separated from its electromagnet and that electromagnet.

These and other objects and features of the invention will be apparent to those skilled in the art from the following specification and the appended drawings in which:

FIGURE 4 is a vertical sectional view through another embodiment of a polarized electromagnetic actuator according to the present invention showing valve operation and magnetic switch indication of armature position;

FIGURE 5 is a detailed transverse sectional view on the line 5—5 of FIGURE 4; and FIGURE 6 is a representation of magnetic hysteresis curves for various materials of the actuator.

Figure 1:
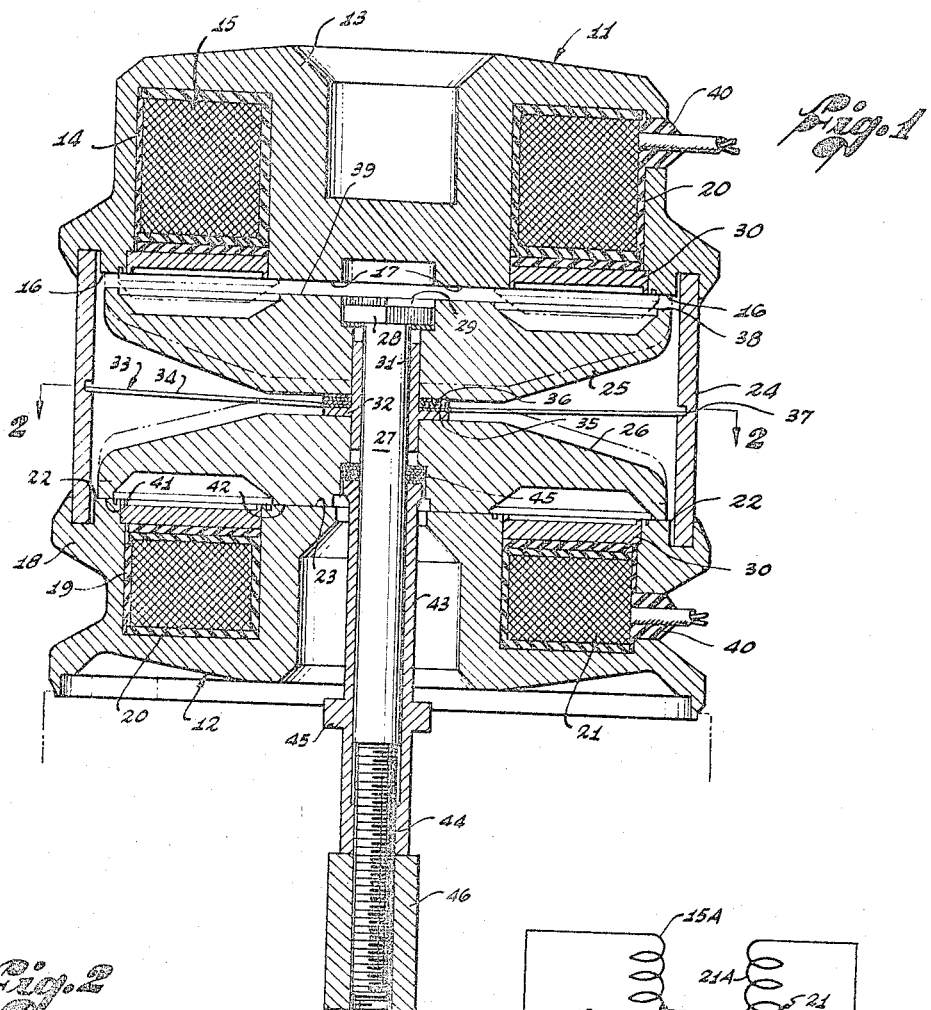
FIGURE 1 is a vertical sectional view through one embodiment of a polarized electromagnetic actuator according to the present invention.

Referring first to the embodiment of the present invention illustrated in FIGURE 1, there are provided a pair of axially-spaced, end electromagnets generally indicated at 11 and 12. The electromagnet 11 has a generally annular field magnet 13 of magnetic material which has an annular recess 14 in which is disposed a magnetizing coil 15 to provide a pair of co-planar, concentric, annular magnetic pole faces facing in the same axial direction, the outer at 16 and the inner at 17, the pole faces being always of opposite polarity and their relative polarity being determined by the direction of flow of the magnetizing current through the coil 15.

The electromagnet 12 similarly has an annular field magnet 18 of magnetic material having an annular recess 19 therein in which is disposed its magnetizing coil 21. The annular field magnet 18 and recess 19 thereby provide a pair of co-planar concentric, annular magnetic pole faces facing in the same axial direction, the outer at 22 and the inner at 23, with the pole faces always of opposite polarity and their relative polarity being determined by the direction of flow of the magnetizing current through the coil 21. The electromagnets 11 and 12 are secured together in the desired spaced relation with their pairs of pole faces facing each other by a cylindrical part 24 of non-magnetic material which is welded or brazed to the field magnets 13 and 18. The annular recesses 14 and 19 are provided with insulating liners 20 to insulate the magnetizing coils from the field magnets and the coils are retained within the recesses by annular closing plates 30 of non-magnetic material. The plates 30 may sealably enclose the recesses 14 and 19 and, together with the resilient terminal wire bushing 40, seal off the coils 15 and 21 from possibly deleterious ambient atmospheres in which the actuator may operate.

Figure 2:
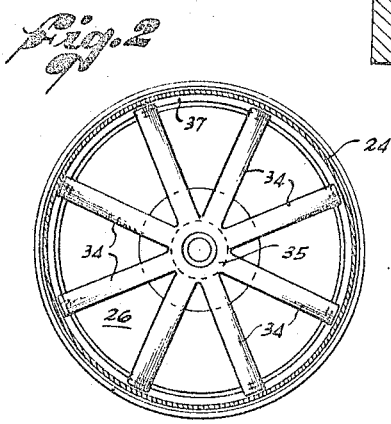
FIGURE 2 is a transverse sectional view on the line 2—2 of FIGURE 1.

Within the cylindrical member 24 and between the electromagnets 11 and 12 is disposed the armature of the actuator, in the illustrated embodiment a pair of oppositely-facing, disc-like or annular permanent magnets 25 and 26 rigidly secured together by a bolt 27 passing through central bores therethrough. The bolt 27 is desirably of non-magnetic material and has a non-circular head 28 at its interior end which is non-rotatably received within a complementary recess 29 in the face of the permanent magnet 25. A non-magnetic sleeve 31 is disposed between the bolt 27 and the bores through the permanent magnets 25 and 26, the sleeve 31 having an integral flange 32 thereon extending into the space between the permanent magnets 25 and 26. A supporting guide indicated generally at 33 and shown in more detail in FIGURE 2 has a plurality of fingers 34 extending outwardly from a central, washer-like portion 35. The central portion 35 is rigidly secured between the sleeve flange 32 and spacing shims 36 to locate it substantially equidistant from the permanent magnets 25 and 26. The ends of the fingers 34 extend into a circular groove or notch 37 in the inner wall of the cylindrical member 24. The supporting guide 33 is preferably of resilient spring material and thereby supports the armature formed by the permanent magnets 25 and 26 in substantially frictionless relation for guided axial movement in opposite directions while restraining the armature against transverse movement. The supporting guide 33 may bias the armature to its central or either extreme position. Alternatively it may be an overcenter, snap acting disc to provide a mechanical latch in either or both extreme armature positions.

The permanent magnets 25 and 26 are of wide magnetic hysteresis loop permanent magnet material, such as Alnico VI, thereby providing high magnetic retentivity. The permanent magnet 25 is shaped and magnetized to provide an outer annular pole face 38 and a concentric, co-planar inner annular pole face 39 of opposite polarity thereto and facing in the same axial direction. The outer annular permanent magnet pole face 38 is disposed opposite the annular pole face 16 on the electromagnet 11 and the inner permanent magnet pole face 39 is disposed opposite the inner annular pole face 17 on electromagnet 11.

Likewise, the permanent magnet 26 is shaped and magnetized to provide an outer annular pole face 41 and an inner, opposite polarity, co-planar and concentric annular pole face 42 facing in the same axial direction. The annular permanent magnet pole face 41 cooperates with the annular pole face 22 on the electromagnet 12 and the inner permanent magnet pole face 42 cooperates with the inner annular pole face 23 on electromagnets 12.

An elongated sleeve 43 of non-magnetic material extends along the bolt 27 and is threaded on the outer end thereof at 44. The end of the sleeve 43 is shimmed against a counterbore abutment in the permanent magnet 26 at 45. The sleeve 43 is provided with a wrench engageable flange 44 by which the sleeve 43 may be tightly secured on the bolt 27 to rigidly mount the permanent magnets 25 and 26 of the armature together. The shimming at 45 may desirably include a lock washer to prevent involuntary loosening of the bolt and permanent magnets connection. A part 46 to be moved by the actuator is threaded on the end of the bolt 27.

The coils 15 and 21 may be energized in a variety of optional ways from a direct current source, with the current flow reversed to give reverse movement of the actuator between its two latching positions engaging and latching to the alternate field magnets 13 and 18. Preferably, both of the coils 15 and 21 are energized at the same time so as to not only apply a pulling force to that permanent magnet spaced by an air-gap from its cooperating field magnet but also to lessen the attraction at the permanent magnet engaged with this field magnet. If the coils 15 and 21 are connected in series, the same current will obviously flow through both. If connected in parallel, it will ordinarily be desired that equal magnetizing currents flow through the separate coils to produce equal effects regardless of the direction of movement of the actuator. However, it is obviously within the inventive concept that the coils 15 and 21 may have different number of turns or be energized with different values of current, depending upon the work cycle of the actuator and differing forces that may be required for its opposite directions of movement.

Figure 3:
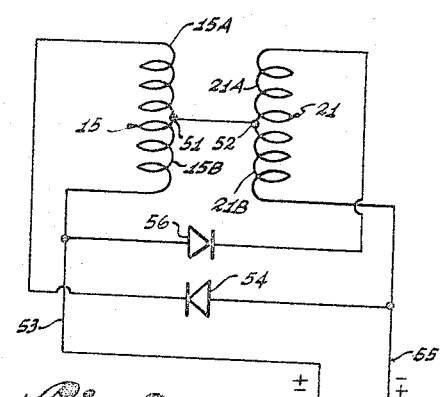
FIGURE 3 is a simplified wiring diagram for the electromagnet coils to provide a larger magnetizing current for the pulling electromagnet.

FIGURE 3 illustrates a wiring diagram for the coils 15 and 21 by which, in effecting an actuator movement, the magnetizing current flowing through the coil for the pulling electromagnet separated from its cooperating permanent magnet of the armature will, in both directions of armature movement, be greater than the current through the coil of the electromagnet to which its cooperating permanent magnet is latched. This energizing condition is particularly desirable where the electromagnet has a narrow hysteresis loop since the reduced current through the coil of the latching electromagnet will still substantially reduce the latching force while not substantially its cooperating permanent magnet. The coils 15 and 21 are interconnected intermediate their ends to divide the magnetizing current between them as desired, and for simplicity are shown interconnected at their midpoints 51 and 52. One end of the coil 15 is directly connected to the control line 53 and the opposite end of the coil 15 is connected through a reverse diode 54 to the control line 55. The coil 21 has one end directly connected to the line 55 and its opposite end connected through a reverse diode 56 to the line 53.

Let it be assumed that the actuator is now in the position illustrated in FIGURE 1 and it is desired to move it to its opposite extreme position with the permanent magnet 25 latched to the electromagnet 11. The lines 53 and 55 are energized so that line 55 is positive and line 53 is negative. Current will therefore flow directly from line 55 through forward diode 54 and both halves 15A and 15B of coil 15 to the line 53. Current will also flow in reverse direction through the half 21B only of coil 21 and in the forward direction through the half 15A of coil 15. Considering normal full flow ampere turns at unity, the coil 21 will therefore have a magnetizing force of only 1/2 NI while the coil 15 will have a magnetizing force of 3/2 NI. Other ratios of magnetizing force can be secured by changing the points of interconnection of the coils, as desired.

It will be obvious that with the armature of the actuator in its upper position, as viewed in FIGURE 1, energization of the lines 53 and 55 reversed to the above is required to reverse the armature position. Then the line 53 will be made positive and the line 55 negative, the currents then flowing directly from line 53 through forward diode 56 and both halves of coil 21 to line 55 and from line 53 reversely through the half 15B of coil 15 and forwardly through the half 21B of coil 21 to the line 55. This again divides the magnetizing forces between the air-gap and latching electromagnets in the ratio of 3/2 NI to 1/2 NI. Flow through the coil half 15A is blocked by the now reversely connected diode 54.

The embodiment of the present invention illustrated in FIGURES 4 and 5 adapts the actuator to the operation of a fluid valve and also shows a magnetic reed switch to provide an external indication of the latching of the armature in a unique position. As the switch is shown, this unique position is the upper, valve closing position of the armature, in which position the contacts of the magnetic reed switch will be moved closed by the flux from the upper electromagnet 11A and will remain closed by the flux from the permanent magnet 25A latched thereto even if the electromagnet 11A is deenergized. The indicating function of the reed switch can be reversed by simply offsetting it downwardly so as to be influenced by the fields from the lower electromagnet 12A and the permanent magnet 26A.

The actuator of FIGURE 4 has a pair of opposed electromagnets 11A and 12A conforming generally in configuration and function to the electromagnets 11 and 12 of the actuator in FIGURE 1. Between the electromagnets 11A and 12A is disposed an armature comprised of permanent magnets 25A and 26A conforming substantially in configuration and function to the permanent magnets 25 and 26 of the actuator of FIGURE 1. Between the permanent magnets 25A and 26A are non-magnetic, annular spacing washers 61 and 62; the magnets and washers are rigidly secured together by non-magnetic, circularly spaced rivets 60. Within the washers 61 and 62 is an internal chamber 63 connected at the top, as viewed in FIGURE 4, to a central bore 54 through the permanent magnet 25A and at the bottom to a central bore 65 through the permanent magnet 26A.

The washer 62 is notched at 66 to receive the inner edge of a disc or spider 33A supporting the armature for free axial movement and which may be of the general configuration and function of the supporting guide 33 of the actuator of FIGURE 1. The electromagnets 11A and 12A are spaced apart by a cylindrical member 24A which is cut-away at its upper internal portion to receive a second cylindrical member 24B which engages and holds the outer ends 24A of the supporting guide 33A.

The electromagnet 11A has a central bore therethrough in which is disposed a valve tube 67 hich extends internally beyond the electromagnet and into the bore 64 through the permanent magnet 25A where it presents an annular valve surface 68 at its end. To the outer end of the valve tube 67 is connected a conduit 69 for the flow of fluid through the valve, the fluid flowing through the chamber 63 and bore 65 to a bore 71 through the electromagnet 12A and a conduit 72 mounted therein.

Within the chamber 63 is floatingly mounted a valve control element 73 having fingers 74 extending radially therefrom to engage the upper wall defining the chamber 63, as shown in FIGURE 4, to provide for flow of fluid through the valve through the spaces 75 between the fingers 74. The valve control element 73 presents a flat disc-like upper surface 76 which engages the valve seat or surface 68 on the valve tube 67 to seal the valve when the armature moves, upwardly as shown in FIGURE 4, to latch the permanent magnet 25A to the electromagnet 11A. The valve closure is under the bias of a compression spring 77 which biases the valve control element 73 to the upper end of the chamber 63, the spacing between the valving surfaces 68 and 76 being less than the spacing between the pole faces of the permanent magnet 25A and the cooperating pole faces of the electromagnet 11A in the valve-open position shown in FIGURE 4.

The materials, energization and operation of the actuator of FIGURE 4 may be the same as those described for the actuator of FIGURE 1.

The magnetic reed switch indicated generally at 81 in FIGURE 4 is a standard commercial item including a sealed enclosing tube 82 of glass or the like having exterior terminals 83, electrically connected to and mechanically supporting magnetic switching arms 84 and 85 which may be integral therewith. The contact ends 86 of arms 84, 85 are normally biased separated but engage, when properly magnetized, to close the circuit through the switch. With the reed switch positioned as shown in FIGURE 4, its contacts will be open when the valve is open. In this position, the magnetic fields induced in the magnetic switching arms 84, 85 are dominated, respectively, by the outer pole of the lower armature permanent magnet 26A and the outer pole of the electromagnet 11A which are of the same polarity. The contact ends 86 of the reed switch 81 will therefore be of the same polarity and repel each other. Even should the electromagnets 11A and 12A be deenergized the reed switch remains open as my field retained by the electromagnet 11A will similarly influence the reed switch or, if it is of a non-retentive material the magnetic effect from the permanent magnets is insufficient to close the switch.

If the electromagnets in FIGURE 4 are energized so as to move the actuator to close the valve, the pole faces on permanent magnet 25A of the armature move into latching engagement with the pole faces on the electromagnet 11A which is polarized to attract it. Due to the upwardly offset position of the reed switch 81, the polarity of the contact end of the reed 84 now reverses, while the polarity of the contact end of reed 85 remains the same, so that the contact ends 86 of the reeds are attracted together to close the circuit through the switch, thereby exteriorly indicating, by the closed circuit condition of the switch, the closed position of the valve. Should the electromagnet coils be deenergized with the valve latched closed, the reed switch will remain closed but should the armature be forced out of latch closing position, the flux through the reed switch is insufficient to hold it closed and it will open to again give a circuit indication that the valve is not latched closed.

The reed switch 81 is initially frictionally held within a non-magnetic strap 87, the cylindrical members 24A and 24B being likewise of non-magnetic material. The offset direction of the reed switch 81 is selected optionally so as to close the circuit through the switch with the valve latched closed, as shown, or offset in the opposite direction to close with the valve latched open. When the position of the reed switch has been regulated for proper operation it is preferably potted or otherwise securely held against involuntary displacement, as by vibration.

The magnetic hysteresis loop 91 of FIGURE 6 represents a non-retentive magnetic material usable for the electromagnets 11, 12, 11A, 12A where there is no substantial magnetic memory and a relative low current will reverse the magnetic polarity. The wider magnetic hysteresis loop 92 represents a semi-permanent magnetic material which may be used for the electromagnets for the magnetic memory operation described above. The wide magnetic hysteresis loop 93 of FIGURE 6 represents the permanent magnet material of the armature permanent magnets 25, 26, 25A, 26A.

While certain preferred embodiments of this invention have been specifically illustrated and described it will be understood that they are exemplary only and that the invention is not limited thereto as many variations will be apparent to those skilled in the art and the invention is to be given its broadest interpretation within the terms of the following claims.

I claim:
1. A polarized electromagnetic actuator comprising a pair of opposed electromagnets, axially aligned and each a pair of opposite polarity pole faces thereon facing axially in the same direction, the pairs facing in opposite directions toward each other; an armature mounted between said electromagnets for axial movement toward and away from the electromagnets; pairs of permanent magnet pole faces on said armature with the pole faces in each pair being of opposite polarity and facing in the same direction and with the pairs facing in opposite directions away from each other and toward their respective electromagnets so that a pair of permanent magnet pole faces cooperates with the pair of pole faces on its adjacent electromagnet to latch alternate one of said pairs of permanent magnet pole faces to alternate electromagnet in the opposite extreme positions of the armature and presenting an air-gap between the other pair of permanent magnet pole faces and the non-latched to electromagnet; and means magnetizing both of said electromagnets at the same time to move said armature, the pair of pole faces of latched-to electromagnet being polarized the same as the pair of permanent magnet pole faces associated therewith and the air-gap electromagnet being reversely polarized.

2. The actuator defined in claim 1 in which said aramture includes a pair of permanent magnets mounted back to back and each presenting a pair of substantially annular, concentric pole faces of opposite polarity facing in the same direction, the permanent magnets facing in opposite axial directions toward the pole faces on said electromagnets so that each permanent magnet and the pair of pole faces thereon cooperates individually with the electromagnet adjacent thereto.

3. The actuator defined in claim 1 in which the permanent magnetic pole faces of each pair are annular and concentric with each other and the axis of the actuator.

4. The actuator defined in claim 1 in which pole faces of the pair on each electromagnet are annular and concentric with each other and the axis of the actuator.

5. The actuator defined in claim 4 in which the pair of common facing annular pole faces on each electromagnet are co-planar.

6. The actuator as defined in claim 1 in which all the pole faces on all the permanent magnets and electromagnets annular with their axes aligned with the axis of movement of the armature and in which the pole faces in the pair on each electromagnet and each permanent magnet are both concentric and co-planar.

7. The actuator defined in calim 1 in which each electromagnet has an annular recess in its inner face defining annular pole faces at the inner and outer diameters of the recess; and magnetizing coils for said electromagnets in said recesses.

8. The actuator defined in claim 1 including a fluid passage extending substantially axially through said electromagnets and armature; and valve means movable by said armature for opening and closing said fluid passage in the opposite extreme positions of the armature.

9. The actuator defined in claim 1 including a magnetic reed switch associated with said actuator and so positioned relative to the magnetic fields of said permanent magnets and electromagnets to indicate by the condition of the circuit therethrough a unique position of the armature.

10. The actuator defined in claim 9 in which said reed switch is offset axially toward one of the electromagnets to be magnetized thereby and by its associated permanent magnet to indicate by the circuit condition through the switch that said associated permanent magnet is latched to said one electromagnet.

11. The actuator defined in claim 1 in which said electromagnets are comprised of a material having a relatively wide magnetic hysteresis loop to provide a magnetic memory of magnetization to secure repulsion between the air-gap electromagnet and the adjacent permanent magnet after the magnetizing current is interrupted.

12. The actuator defined in claim 1 including means suspending said armature between said electromagnets for substantially frictionless, axial movement without sliding engagement with the armature.

13. The actuator defined in claim 12 in which said suspending means is comprised of spring means positively engaging the armature and a fixed part to provide for armature movement by flexing the spring means without sliding engagement with the armature.

References Cited

UNITED STATES PATENTS

| | | | |
|---|---|---|---|
| 3,040,146 | 6/1962 | Immel et al. | 335—205 X |
| 3,176,097 | 3/1965 | Wood | 335—215 X |

BERNARD A. GILHEANY, *Primary Examiner.*

J. J. BAKER, H. BROOME, *Assistant Examiners.*